US012106147B2

(12) United States Patent
Guo et al.

(10) Patent No.: US 12,106,147 B2
(45) Date of Patent: Oct. 1, 2024

(54) RESOURCE ALLOCATION IN A CLOUD COMPUTING SYSTEM BASED ON PREDICTIONS OF WORKLOAD PROBABILITY PARAMETERS

(71) Applicant: SAP SE, Walldorf (DE)

(72) Inventors: Jing Guo, Xi'an (CN); Zhou Yang, Xi'an (CN); Ming Yan, Xi'an (CN); Gaozhi Wang, Xi'an (CN); Shifan Cheng, Xi'an (CN); Zhaoxing Zeng, Xi'an (CN); Jingtao Li, Xi'an (CN)

(73) Assignee: SAP SE, Walldorf (DE)

( * ) Notice: Subject to any disclaimer, the term of this patent is extended or adjusted under 35 U.S.C. 154(b) by 547 days.

(21) Appl. No.: 17/352,634

(22) Filed: Jun. 21, 2021

(65) Prior Publication Data
US 2022/0405134 A1 Dec. 22, 2022

(51) Int. Cl.
G06F 9/46 (2006.01)
G06F 9/50 (2006.01)
G06N 3/08 (2023.01)
G06N 7/01 (2023.01)

(52) U.S. Cl.
CPC ............. *G06F 9/5005* (2013.01); *G06N 3/08* (2013.01); *G06N 7/01* (2023.01)

(58) Field of Classification Search
CPC ........... G06F 9/5005; G06N 7/01; G06N 3/08
See application file for complete search history.

(56) References Cited

U.S. PATENT DOCUMENTS

| 2018/0027092 | A1* | 1/2018 | Foged ..................... G06N 3/08 706/12 |
| 2019/0286486 | A1* | 9/2019 | Ma ........................ G06F 9/5027 |
| 2020/0374339 | A1* | 11/2020 | Billore ................. H04L 67/1004 |
| 2021/0294403 | A1* | 9/2021 | Calugaru ............... G06N 3/044 |

* cited by examiner

*Primary Examiner* — Tammy E Lee
(74) *Attorney, Agent, or Firm* — Sterne, Kessler, Goldstein & Fox P.L.L.C.

(57) ABSTRACT

Disclosed herein are system, method, and computer program product embodiments for allocating resources based on predictions of workload probability parameters. The method can include collecting a first set of historical workload data generated by operating a first set of one or more applications at a first number of past time instances; predicting probability parameters of a second set of future workload data for operating a second set of one or more applications at a second number of future time instances; and determining future resources allocated to operating the second set of one or more applications for the second number of future time instances, based on allocated current resources, a lower bound of resources to satisfy a quality of service (QoS) for operating the second set of one or more applications, an upper bound of resources to satisfy the QoS, and the predicted probability parameters.

18 Claims, 9 Drawing Sheets

DHAAS- data hub as a service

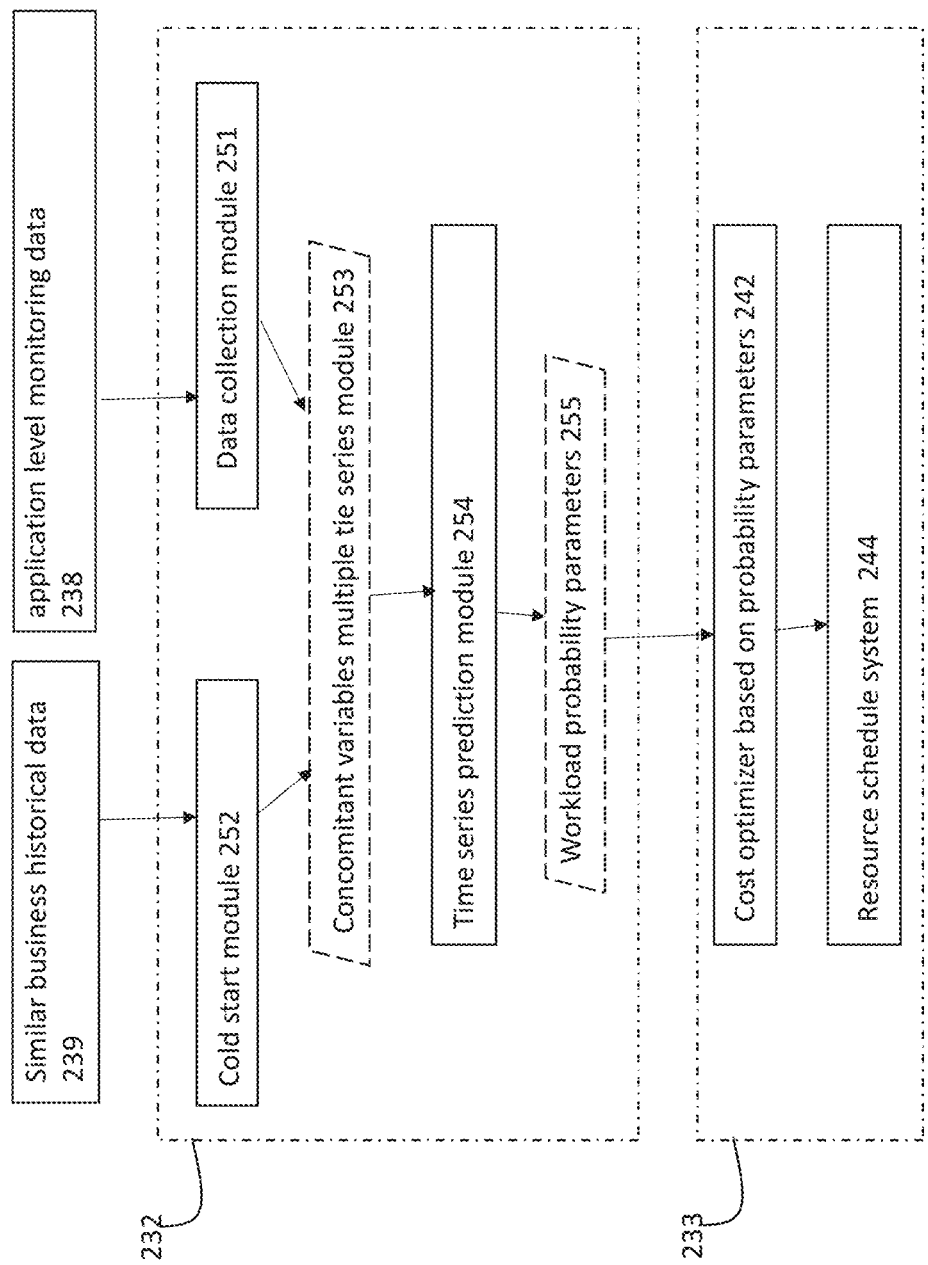

RESOURCE ALLOCATION IN A CLOUD COMPUTING SYSTEM BASED ON PREDICTIONS OF WORKLOAD PROBABILITY PARAMETERS

BACKGROUND

Cloud computing refers to a pay-per-use on-demand availability of computer system resources, such as data storage (cloud storage) and computing power provided by a cloud computing system without direct active management by a user. A cloud computing system can have computing resources distributed over multiple locations. For many companies, cloud computing has become a preferable solution for providing various types of processor, memory, and network-intensive applications over the Internet. An important feature of cloud computing is elasticity, which allows the provisioning and de-provisioning of computing resources on-demand. As the application's workload becomes more dynamic and varies over time, balancing costs and quality of services on the resource allocation for the applications becomes a challenge for cloud computing system providers and the users alike.

BRIEF DESCRIPTION OF THE DRAWINGS

The accompanying drawings are incorporated herein and form a part of the specification.

FIGS. 2A-2C are block diagrams illustrating a system for allocating resources based on predictions of workload probability parameters, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
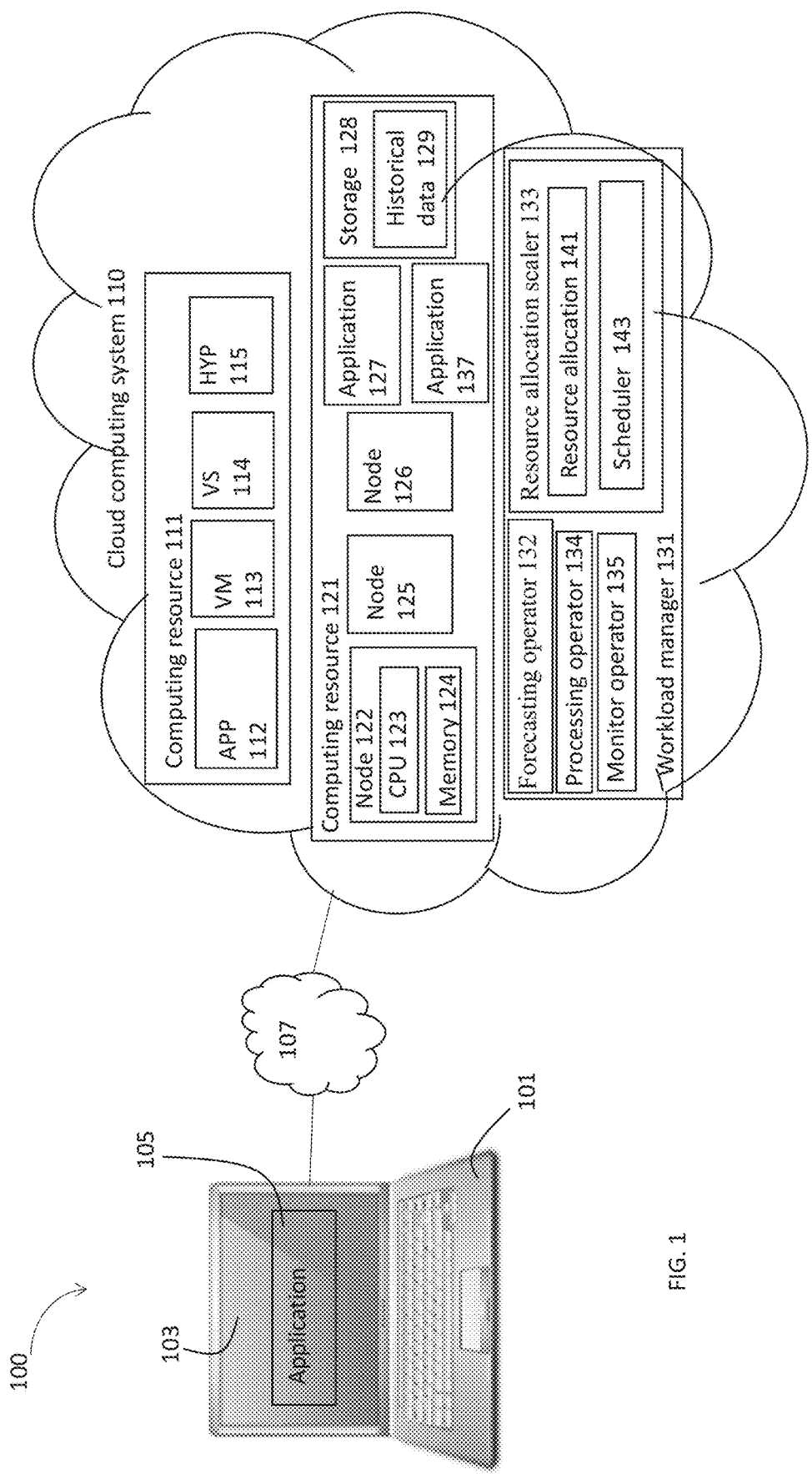
FIG. 1 is a block diagram illustrating a system for allocating resources based on predictions of workload probability parameters, according to some embodiments.

Provided herein are system, apparatus, device, method and/or computer program product embodiments, and/or combinations and sub-combinations thereof, for allocating resources based on predictions of workload probability parameters of future workload data for operating one or more applications at a number of future time instances of time series. In a cloud computing system, resources are shared among multiple uses and can be allocated based on needs and payments. A work load manager can predict workload probability parameters of future workload data for operating one or more applications at a number of future time instances. The work load manager can further allocate resources based on the predicted workload probability parameters of future workload data.

Some current cloud computing systems can perform prediction of future resource needs. However, such predictions do not take into account the randomness of the future workload data. Instead, the predictions only provide certain fixed threshold values, which do not change with time and cannot respond effectively to the dynamic fluctuations of the future workload. Some other predictions can provide some value predictions to indicate the values of time-series for future resource needs. However, such time-series values at a number of future time instances still do not take into consideration of the randomness of the future workload data. Therefore, current prediction tools can often fail to provide an accurate prediction in the face of significant variability in client workload patterns, leading to resource allocation mismatching the computing needs of the future workload data. For example, computing resources can be under allocated that leads to low service performance for the applications, or over allocated that leads to high expense to the user for resources not needed. Additionally, to make the predictions, current prediction tools essentially require a long period historical data, which are not applicable to applications with little or no historical data.

Embodiments herein can provide predictions of workload probability parameters of future workload data for operating one or more applications at a number of future time instances of time series. In comparison with the fixed threshold values prediction or predictions for time-series values for future computing resources, predictions of workload probability parameters of future workload data can respond effectively to the dynamic fluctuations of workload even in a brief period. In some embodiments, the predictions of workload probability parameters of future workload data are performed by recurrent neural networks (RNN) developed to learn the nonlinear time-space relationships of future workload data. Resource allocated based on predictions of workload probability parameters of future workload data can satisfy a quality of service (QoS) for operating the one or more applications, while keeping the waste of allocated resource low. In addition, embodiments herein can support cold start predictions with little or no historical workload data. Performance data show that embodiments herein can allocate resources more reasonably and accurately than other available methods and systems. Embodiments herein can satisfy both the application QoS while keeping operational costs low.

FIG. 1 is an example block diagram illustrating a system 100 for allocating resources based on predictions of workload probability parameters, according to some embodiments. System 100 may include a user device 101, and a cloud computing system 110 communicatively coupled by a network 107.

In some embodiments, user device 101 may be any device used by a user to perform various computing or communication tasks. For example, user device 101 may be a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, a server, an embedded device, or a similar type of device. User device 101 may include a display 103, and one or more applications 105. User device 101 can include other components such as one or more processors, storage devices, not shown.

In some embodiments, one or more portions of network 107 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

In some embodiments, cloud computing system 110 includes an environment that delivers computing as a service, whereby shared resources, services, etc. Cloud computing system 110 may provide computation, software, data access, storage, and/or other services that do not require end-user knowledge of a physical location and configuration of a system and/or a device that delivers the services. Cloud computing system 110 may include computer resource 111, computing resource 121, and a workload manager 131, in addition to other clouding computing components.

Each computing resource, e.g., computer resource 111, computing resource 121, can include one or more personal computers, workstations, computers, server devices, or other types of computation and/or communication devices, and computing instances executing in computing resources. A computing resources, e.g., computer resource 111, computing resource 121, may communicate with other cloud computing resources via wired connections, wireless connections, or a combination of wired or wireless connections.

In some examples, computer resource 111 may include a group of cloud resources, such as one or more applications ("APPs") 112, one or more virtual machines ("VMs") 113, virtualized storage ("VS") 114, and one or more hypervisors ("HYPs") 115. APP 112 may include one or more software applications that may be provided to or accessed by other components or computing devices, e.g., user device 101.

Virtual machine 113 may include a software implementation of a machine (e.g., a computer) that executes programs like a physical machine. Virtual machine 113 may be either a system virtual machine or a process virtual machine, depending upon the use and degree of correspondence to any real machine by virtual machine 113. A system virtual machine may provide a complete system platform that supports execution of a complete operating system (OS). A process virtual machine may execute a single program and may support a single process. Virtual machine 113 may execute on behalf of a user (e.g., user device 101), and may manage infrastructure of the cloud computing system 110, such as data management, synchronization, or long duration data transfers.

Virtualized storage 114 may include one or more storage systems and/or one or more devices that use virtualization techniques within the storage systems or devices of computing resource 111. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how administrators manage storage for end users. File virtualization may eliminate dependencies between data accessed at a file level and location where files are physically store. This may enable optimization of storage use, server consolidation, and/or performance of non-disruptive file migrations.

Hypervisor 115 may provide hardware virtualization techniques that allow multiple operations systems (e.g., "guest operating systems") to execute concurrently on a host computer, such as computing resource 111. Hypervisor 115 may present a virtual operating platform to the guest operating systems, and may manage the execution of the guest operating systems multiple instances of a variety of operating systems and may share virtualized hardware resource.

Computing resource 121 can be an example of computing resource 111, and can include various computing nodes, e.g., node 122, node 125, node 126, and storage 128. Node 122, and similarly other nodes, can be a computing device or a virtual machine, e.g., VM 113, and can include a processor 123 and a memory 124. One or more applications, e.g., application 127 and application 137, can operate on computing resource 121 including node 122, node 125, node 126, and storage 128. Historical workload data 129 can be generated by operating a first set of one or more applications, e.g., application 127, at a first number of past time instances, and can be stored in storage 128.

Workload manager 131 can allocate resources based on predicted probability parameters of future workload data for operating one or more applications, e.g., application 137, at future time instances. Workload manager 131 can include various components, such as a workload forecasting operator 132, a resource allocation scaler 133, a processing operator 134, and a monitor operator 135. Resource allocation scaler 133 can further include other components, e.g., a resource allocation unit 141, and a scheduler 143.

In some embodiments, processing operator 134 can coordinate and operate a first set of one or more applications, e.g., application 127, at a first number of past time instances. Processing operator 134 can coordinate and operate a second set of one or more applications, e.g., application 137, at a second number of future time instances. In some embodiments, the first set of one or more applications include same applications as the second set of one or more applications. Hence, application 127 can be the same as application 137. In some other examples, the second set of one or more applications is different from the first set of one or more applications. Hence, application 127 can be different from application 137. When application 137 is different from application 127, application 137 can share at least a feature similar to a feature of application 127.

In some embodiments, monitor operator 135 can collect a first set of historical workload data 129 generated by operating the first set of one or more applications, e.g., application 127, at a first number of past time instances. The first set of historical workload data 129 can include a CPU usage, a memory utilization, a network bandwidth, a latency, a delay, or a throughput. The first set of historical workload data 129 can be generated at a first number of past time instances, which can include 5 past time instances. In some examples, a first time instance and a second time instance of the first number of past time instances can be separated by 1 hour. The number of time instances and the gap between two time instances are for examples only, and are not limiting. There can be other number of time instances, and two time instances can have a different gap. The first set of historical workload data 129 can follow a Gaussian distribution or a Poisson distribution.

In some embodiments, workload forecasting operator 132 can predict probability parameters of a second set of future workload data for operating the second set of one or more applications, e.g., application 137, at a second number of future time instances. Workload forecasting operator 132 can predict the probability parameters based on recurrent neural networks (RNN). The second set of future workload data can follow a Gaussian distribution, a Poisson distribution, a binomial distribution, or some other probability distributions. The second set of future workload data can include a CPU usage, a memory utilization, a network bandwidth, a latency, a delay, or a throughput. The predicted probability parameters can include an average of the second set of future workload data, a standard deviation of the second set of future workload data, or a probability density function of the second set of future workload data. The second number of future time instances can include 5 future time instances. A first time instance and a second time instance of the second number of future time instances can be separated by 1 hour.

In some embodiments, resource allocation scaler 133 can include resource allocation unit 141 and scheduler 143. Resource allocation unit 141 can determine the future resources allocated to operate the second set of one or more applications, e.g., application 137, for the second number of future time instances. The future resources can be allocated based on the allocated current resources, a lower bound of resources to satisfy a quality of service (QoS) for operating the second set of one or more applications, an upper bound of resources to satisfy the QoS, and the predicted probability parameters. The future resources and the current resources can include a number of computing nodes of the computing platform, a number of storage units of the computing platform, or an allocation of network bandwidth. The future resources allocation can be determined for reducing a first probability of allocating resources over the upper bound of resources and a second probability of allocating resources below the lower bound of resources. In some examples, the future resources allocation can be specified as an offset resource to increase to or decrease from the current resources. The process that resource allocation scaler 133 adjusts resource allocated for the applications based on the predictions made by workload forecasting operator 132 may be referred to as the auto-scaling of workload.

In some embodiments, scheduler 143 can schedule the determined future resources of system 100 for the second number of future time instances. In addition, processing operator 134 can operate the second set of one or more applications on the scheduled future resources to generate workload data.

Figure 2A:
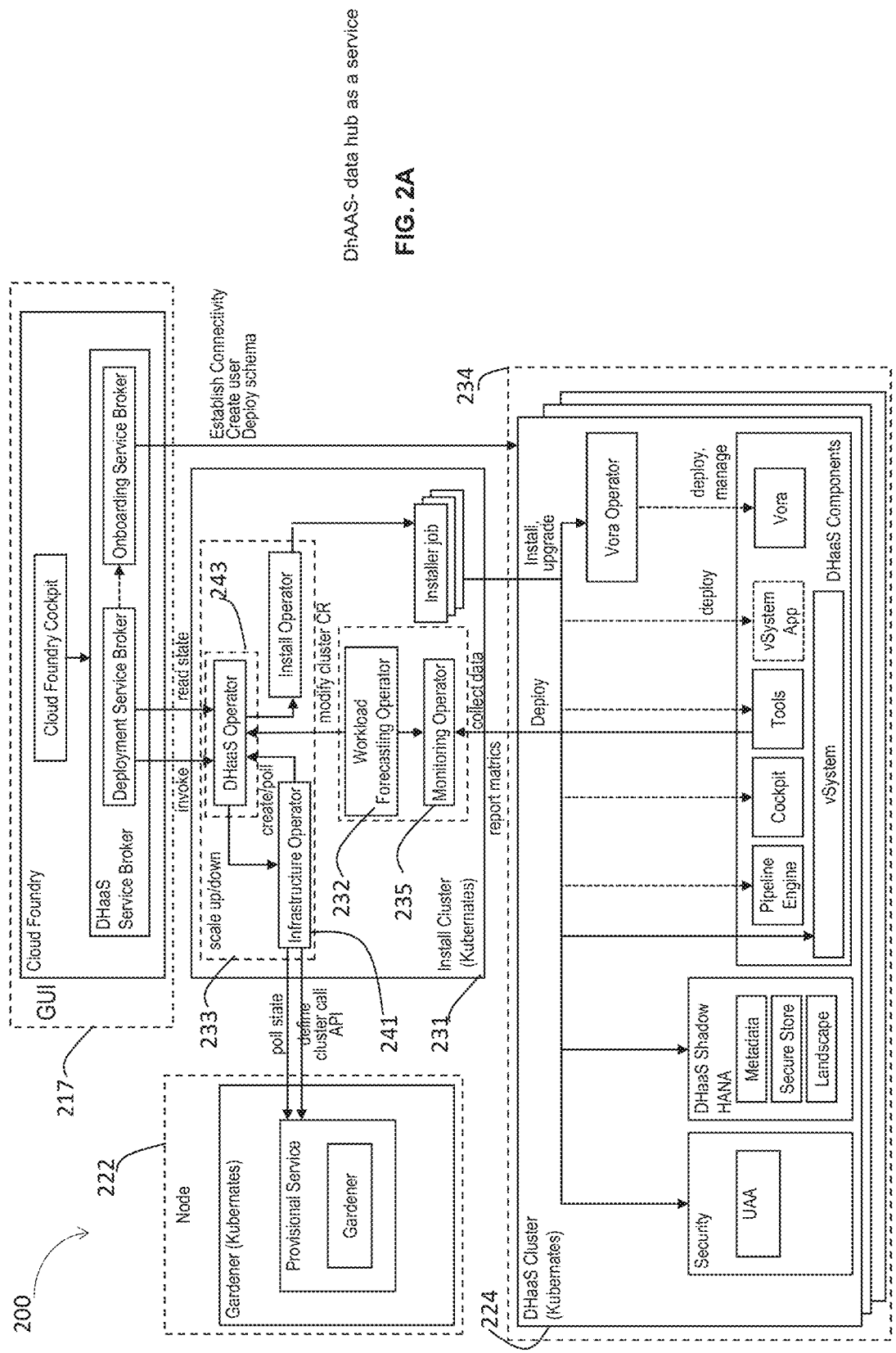
Figure 2C:
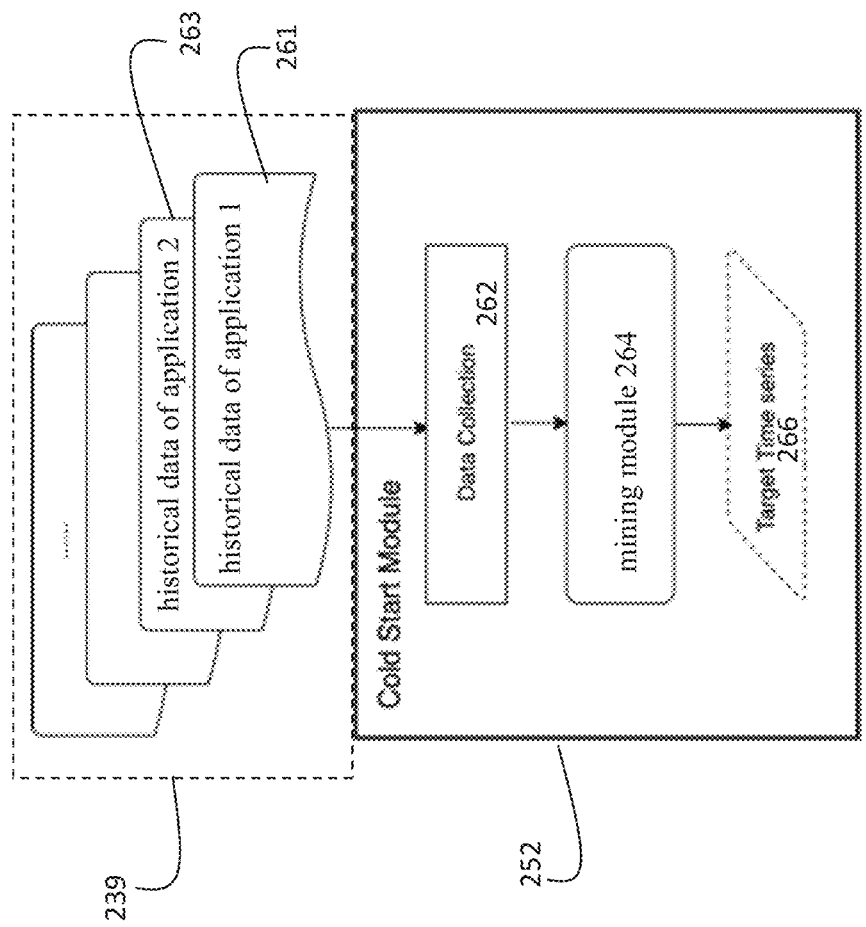

FIGS. 2A-2C are block diagrams illustrating a system 200 for allocating resources based on predicted probability parameters of future workload data, according to some embodiments. System 200 can be viewed as an example of system 100. Operations described for system 200 are examples of operations performed in system 100.

In some embodiments, system 200 can include one or more node 222, a cluster of nodes 224, a graphical user interface (GUI) 217, and a workload manager 231. Workload manager 231 can include a workload forecasting operator 232, a resource allocation scaler 233, a processing operator 234, and a monitor operator 235. Resource allocation scaler 233 can further include other components, e.g., infrastructure operator 241, and a DHaaS operator 243. Node 222, workload manager 231, workload forecasting operator 232, resource allocation scaler 233, processing operator 234, monitor operator 235, infrastructure operator 241, and DHaaS operator 243, are examples of the corresponding components as shown in FIG. 1, such as node 122, workload manager 131, workload forecasting operator 132, resource allocation scaler 133, processing operator 134, monitor operator 135, resource allocation unit 141, and scheduler 143. In the following, operations of resource allocation scaler 233 including infrastructure operator 241 and DHaaS operator 243, and workload forecasting operator 232 are described in more details. Operations performed by other components are similar to corresponding components as described for FIG. 1.

In some examples, system 200 may be implemented in some details. For example, infrastructure operator 241 performs functions similar to functions performed by resource allocation unit 141. There is a dynamic node pool with configurable maximum and minimum number of nodes, such as node 122, node 125, node 126, or multiple nodes 222. Resource allocation scaler 233 can allocate a cluster of nodes, such as the Kubernetes cluster of nodes 224, which can be a subset of the node pool. In addition, infrastructure operator 141 can be responsible for creating and tearing down Kubernetes clusters using Gardener.

According to some examples, resource allocation scaler 233 can adjust resource allocation based on a fixed threshold value predictions made by workload forecasting operator 232. For example, resource allocation scaler 233 can adjust resource allocation using rules related to the fixed threshold value predictions, which may be based on infrastructure-level metrics, such as CPU utilization measured by the number of nodes. Processing operator 234 can operate applications, e.g., vSystem application, on the cluster of nodes 224, which is a Kubernates cluster. Resource allocation scaler 233 can scale up and down the number of nodes within the cluster of nodes 224 based on the usage of the workloads by various applications, e.g., vSystem application. Resource allocation scaler 233 can scale up the number of nodes when a node resource usage is over the fixed threshold value. On the other hand, resource allocation scaler 233 can scale down the number of nodes when a node resource usage is below the fixed threshold value. Scaling up or down operations performed by resource allocation scaler 233 may be useful for some basic types of cloud applications. However, there are some disadvantages associated with the scaling up or down based on the fixed threshold value performed by resource allocation scaler 233, such as a long scaling up or down time in the range of tens of minutes. Such a long scaling up or down time can lead to performance and resource utilization degradation for network-intensive and time-critical applications. In addition, it is not a trivial task to define the fixed threshold value to scale up or down the underlying infrastructure accurately. Often such a fixed threshold value is provided by a user. Thus, the burden of scaling falls on the user. Since application workload may change frequently, it is difficult to define the fixed threshold value to meet the needs of the frequently changing workload. In addition, the application workload may change with a statistical pattern and regularity, scaling up or down resource allocation based on the fixed threshold value can fail to take advantage of such a statistical pattern and regularity of the workload.

According to some examples, resource allocation scaler 233 can adjust resource allocation based on value prediction made by workload forecasting operator 232 using time-series data. The predicted value is not a probability parameter of the workload data, instead it is the needed computing resources, e.g., the number of nodes needed. For example, using the Kubernetes cluster of nodes 224 allocated to operate the applications, e.g., vSystem application, as an example, resource allocation scaler 233 can adjust resource allocation using a scaling rule calculated based on a linear function $f(y_t)$ of the prediction of the values on 5-time points in the future: $y_t=u$, $t=1\ 2, 3, 4, 5$, where u is the number of nodes allocated in the Kubernetes cluster of nodes 224. The scale rule can be $\max\{f(y_1)-s, f(y_2)-s, f(y_3)-s, f(y_4)-s, f(y_5)-s\}$, s is the current node scale or count. Adjusting resource allocation by resource allocation scaler 233 based on value prediction using time-series data can similarly suffer the inaccuracy in the predicted value, while failing to consider the randomness of the workload. When there is a deviation in the predicted value, the user may end up to pay the extra resource beyond the predicted value. For example, due to the randomness of the application service metric, if the workload has a rapid increase during a period of time, the deviation between the real usage of nodes and the predicted value may result in insufficient resources, which can significantly impact the service quality of the application with high costs to the user.

In some embodiments, resource allocation scaler 233 can adjust resource allocation based on predictions of workload probability parameters of time series. As a result, embodiments herein can provide improved resource usage solution based on probability density function tailored for different business scenarios. The predictions are made for probability parameters of the workload data, not directly the computing resources. Workload forecasting operator 232 can use RNN to learn the nonlinear time-space relationships, which can predict probability parameters by training time-series data. Workload forecasting operator 232 can predict probability parameters such as an average of the future workload data, a standard deviation of the future workload data, or a probability density function of the future workload data. In addition, resource allocation scaler 233 can allocate the resource based on estimating its risk and profit to achieve higher profit or lower risk by enumerating all the allowable resource allocations.

In some embodiments, more details of workload forecasting operator 232 and resource allocation scaler 233 are illustrated in FIG. 2B. In detail, workload forecasting operator 232 can include a data collection module 251, a cold start module 252, a time series prediction module 254 to predict the workload probability parameters 255. In addition, resource allocation scaler 233 can include a cost optimizer 242 which is based on the predicted workload probability parameters, and a resource schedule system 244.

In some embodiments, workload forecasting operator 232 can receive dataset 238, which are application level monitored data, from monitoring operator 235. Monitoring operator 235 can be used to monitor the resources used by the cluster of nodes 224 and monitor the workload of vsystem applications, and provide the workload dataset 238 for training time series prediction module 254. Time series prediction module 254 can support workload forecasting operator 232 to offer a solution of on-demand resources based on the user-defined strategy. For example, cost optimizer 242 of resource allocation scaler 233 can find a solution targeting high QoS service, low cost service, a general or a default service, or a customized targeted service. As a result, workload manager 231 can adjust resource allocation with more intelligence to consider the randomness of the future workload, including workload surges and dropdown. Workload manager 231 can also provide an improved solution considering both QoS and cost, focusing on their business targets.

In some embodiments, workload forecasting operator 232 may work under some assumptions. To simplify the process, examples presented herein only consider one type of cluster, e.g., the cluster of nodes 224. The number of nodes is denoted as f(u) for the workload of the application. When the workload is u, the number of nodes that could provide the lowest QoS for the application is W, while the number of nodes that could provide the highest QoS for the application is Q. Hence, an equation Q>f(u)>W is satisfied.

In some embodiments, a time series can have 5-time steps as a period, where two adjacent time instances have a time interval of 1 hour. At the end of a period, if the average number of nodes being allocated to the application is more than Q, a waste has happened. On the other hand, if the average number of nodes being allocated to the application is less than W, an accident has happened. It is desired that workload manager 231 can find a resource allocation to avoid any waste or accident.

In some embodiments, workload forecasting operator 232 can use data collection module 251 to receive dataset 238 from monitoring operator 235, which are a set of historical workload data. Dataset 238, which can be application level monitored data, can include a CPU usage, a memory utilization, a network bandwidth, a latency, a delay, or a throughput. In some examples, CPU usage in terms of the number of nodes can be used as an example of workload data. In addition, concomitant variables module 253 can collect multiple datasets for multiple variables.

In some embodiments, some raw time series dataset may be of the form: {"start": "2020-06-30 12:00:00", "target": [110, 98, 90, . . . ], "dynamic_feat": [[100, 83, 76, . . . ],[80.1,78.3,75.5, . . . ], [0,1,0, . . . ]]}, which can be generated by concomitant variables module 253. The keyword "start" can be of the format "YYYY-MM-DD HH:MM: SS", representing the start time. The time series data can be sampled once an hour. The keyword "target" can be the CPU utilization time series. The keyword "dynamic_feat" is the time series vectors of customized features related to target prediction data. In this example, three groups time series data are presented including memory utilization time series data, network traffic time series data, and whether it is on working time (0: yes, 1: no). The additional dataset, e.g., the memory utilization, the network traffic, collected by concomitant variables module 253, can provide a more accurate prediction result based on these extra concomitant variables.

In some embodiments, cold start module 252 can support cold start prediction with little or no data collected for the application, for which the future workload data is to be predicted. Similar business historical data 239 from similar types of application workload time series, can be used by cold start module 252, which can be used as a training input to time series prediction module 254. More detailed descriptions are shown in FIG. 3C.

In some embodiments, time series prediction module 254 can perform the forecast and prediction to produce the probability parameters 255 of time series as future workload data for operating the applications at a second number of future time instances. Assuming y is the workload of application at a time step in future, the probability density of workload y can be denoted as P(y). In some examples, y follows the Gaussian distribution the Poisson distribution. Time series prediction module 254 can use RNN to learn the nonlinear time-space relationships.

In some embodiments, cost optimizer 242 of resource allocation scaler 233 can allocate resource based on the predicted probability parameters. In some examples, it may be assumed that y is Gaussian distribution: $N(\mu, \sigma^2)$, and the loss of a waste equals that of an accident. Furthermore, s can denote the current node count and x as the planning scale up/down of node count (x is positive when increasing nodes, and it is negative when reducing nodes), $r_1$ can be the probability of a waste, $r_1=P(f(y)-x-s<W)$, and $r_2$ can be the probability of an accident, $r_2=P(f(y)-x-s>Q)$, $0<r_1<1$; $0<r_2<1$. Cost optimizer 242 can obtain a solution to minimize $\min(r_1+r_2)^2/2$ among the set of possible resource allocations. Based on this model, the solution x can be determined for each future time instance $\{x_1, x_2, x_3, x_4, x_5\}$, where $x=\max\{x_1, x_2, x_3, x_4, x_5\}$. The assumptions and solutions are provided as examples. There can be other assumptions with different solutions for different applications.

In some embodiments, the loss of an accident can be greater than that of waste, and the duration of scaling up can be longer than that of scaling down. Considering that the requirements of cost and QoS on applications are different, cost optimizer 242 can adjust the model to find a solution to minimize $\min(w_1 r_1 + w_2 r_2)^2$, $w_1$, $w_2$ are the weight coefficient for a waste and an accident, and for most of cases, $w_1 > w_2$. A user can define the specific values $w_1$, $w_2$ based on their business requirements. For the weighted minimization $\min(w_1 r_1 + w_2 r_2)^2$, a solution x can be obtained that is different from a solution obtained by $\min(r_1 + r_2)^2/2$. Once cost optimizer 242 of resource allocation scaler 233 determines the solution x, resource schedule system 244 can schedule the resources for operating the application. Resource schedule system 244 can be implemented as a part of infrastructure operator 241 or a part of the DHaaS Operator 243.

FIG. 2C illustrates more details of cold start module 252, which is a part of workload forecasting operator 232. In some examples, historical time series data for new applications may not be available to be used by workload forecasting operator 232 to predict the probability parameters of future workload data for operating the applications. In some other examples, the applications have been moved to a new cluster of nodes, and their performance cannot be predicted using the historical time series data obtained from a previous cluster of nodes. Cold start module 252 can learn across target time series, related time series, and application metadata, making predictions for cold-start scenarios. Cold start module 252 can forecast demand for new applications that share similar characteristics to the other applications. Cold start module 252 can receive variable-length time series data as inputs and map them to generate variable-length time series data as outputs for the prediction window. For forecasting the new application workload, a RNN algorithm— Long Short Term Memory (LSTM) machine learning is used to learn common traits based on the other similar application or old version of this application. The model can forecast and generate the target's new time series data by learning relationships from multiple related time series of the training data.

In some examples, cold start module 252 can include a data collection module 262 to receive multiple historical data such as a historical time series data 261 for a first application and a historical time series data 263 for a second application, a mining module 264 to mine multiple historical data for similar applications to generate target time series data 266 from the multiple historical data for similar applications. The first application and the second application can be similar to the application whose workload is being predicted. The first application can be different from the second application.

Consider the example of forecasting a new search website that is deployed on a server. The visits to this website can be as high as an e-commerce site. Furthermore, it also has computing features to provide a searching engine for customers. Cold start module 252 can learn this new site's typical behavior based on the workload dataset of other types of e-commerce sites and search sites when they were first deployed. By learning relationships from multiple related time series within the training data, cold start module 252 can provide more accurate forecasts than the existing alternatives.

In some examples, the CPU utilization time series data can be defined as the target prediction workload. A two-dimensional vector cat 32 $[c_1, c_2]$ is related to two features of the new site, $c_1$ represents whether the site or application has I/O intensive feature(0=no, 1=yes), $c_2$ represents whether the site or application has CPU intensive feature (0=no, 1=yes).

The input time series data for the prediction model can be denoted as: {"start":"2020-01-01", "target": [0.1, 0.3, 0.2 . . . ], "cat": [1,0]} (for an e-commerce site with similar I/O intensive feature); {"start": "2020-01-01", "target": [0.1, 0.3, 0.2 . . . ], "cat": [0,1]} (for a search site with similar CPU intensive feature). These two time series data can be examples of the similar business historical data 239. The two time series data can be combined by mining module 264 as the historical workload dataset by the prediction model to obtain the target time series data: {"start":"2020-01-01", "target": [0.42, 0.87, 0.72 . . . ], "cat": [1,1]} (for the target web site training historical dataset for cold start).

Figure 3:
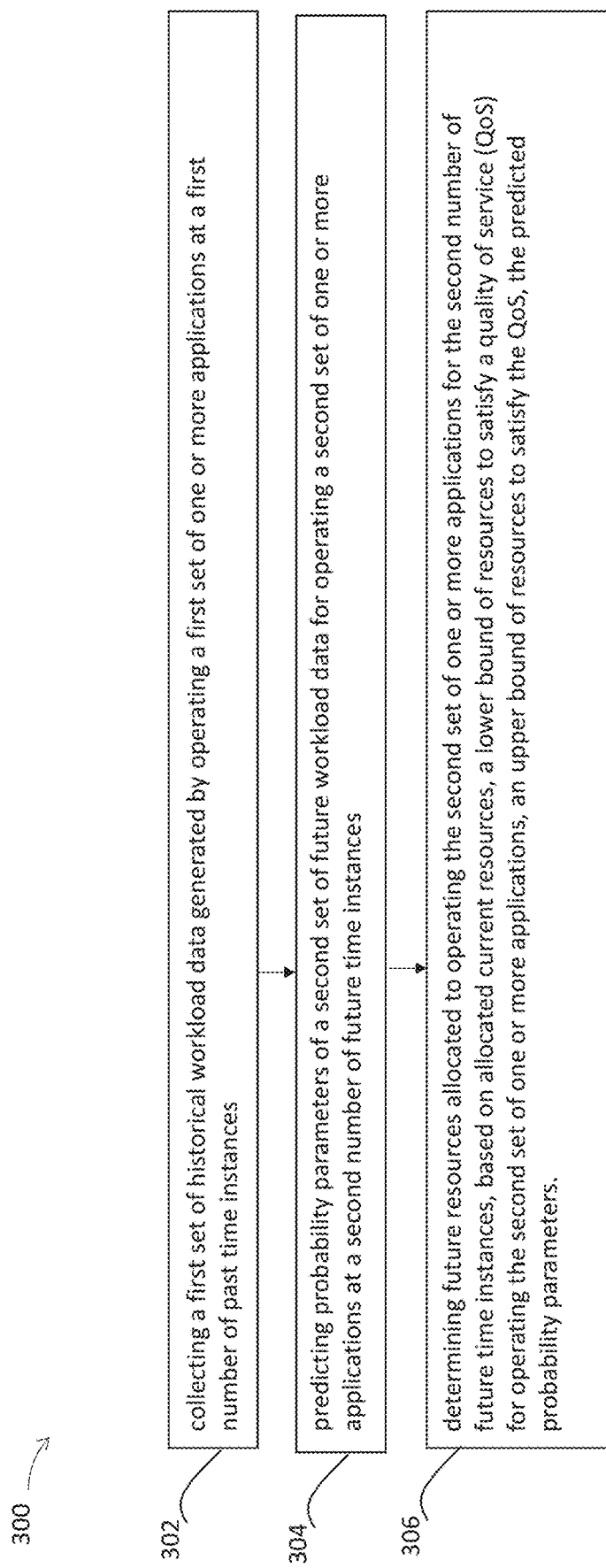
FIGS. 3 is a diagram illustrating an example process for allocating resources based on predictions of workload probability parameters, according to some embodiments.

FIG. 3 is a diagram illustrating processes for allocating resources based on predicted probability parameters of future workload data, according to some embodiments. Processes 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

At 302, a monitor operator can collect a first set of historical workload data generated by operating a first set of one or more applications at a first number of past time instances. For example, as shown in FIGS. 2A-2B, monitor operator 235 can collect dataset 238 obtained by operating applications at past 5 time instances.

At 304, a workload forecasting operator can predict probability parameters of a second set of future workload data for operating a second set of one or more applications at a second number of future time instances. For example, as shown in FIGS. 2A-2B, workload forecasting operator 232 can use time series prediction module 254 to predict workload probability parameters 255.

At 306, a resource allocation scaler can determine future resources allocated to operating the second set of one or more applications for the second number of future time instances. The future resources allocated can be determined based on allocated current resources, a lower bound of resources to satisfy a quality of service (QoS) for operating the second set of one or more applications, an upper bound of resources to satisfy the QoS, the predicted probability parameters. For example, as shown in FIGS. 2A-2B, resource allocation scaler 233 can use cost optimizer 242 to determine future resources allocated to operating the second set of one or more applications for the second number of future time instances. The future resources are determined for reducing a first probability of allocating resources over the upper bound Q of resources and a second probability of allocating resources below the lower bound W of resources. The future resources allocated can be determined based on loop all the possibility then select a value that minimizing the total amount of waste and accidents, to find a solution x satisfying $\min(w_1 r_1 + w_2 r_2)^2$, $r_1$ is the probability of a waste, $r_2$ is the probability of an accident.

Figure 4A:
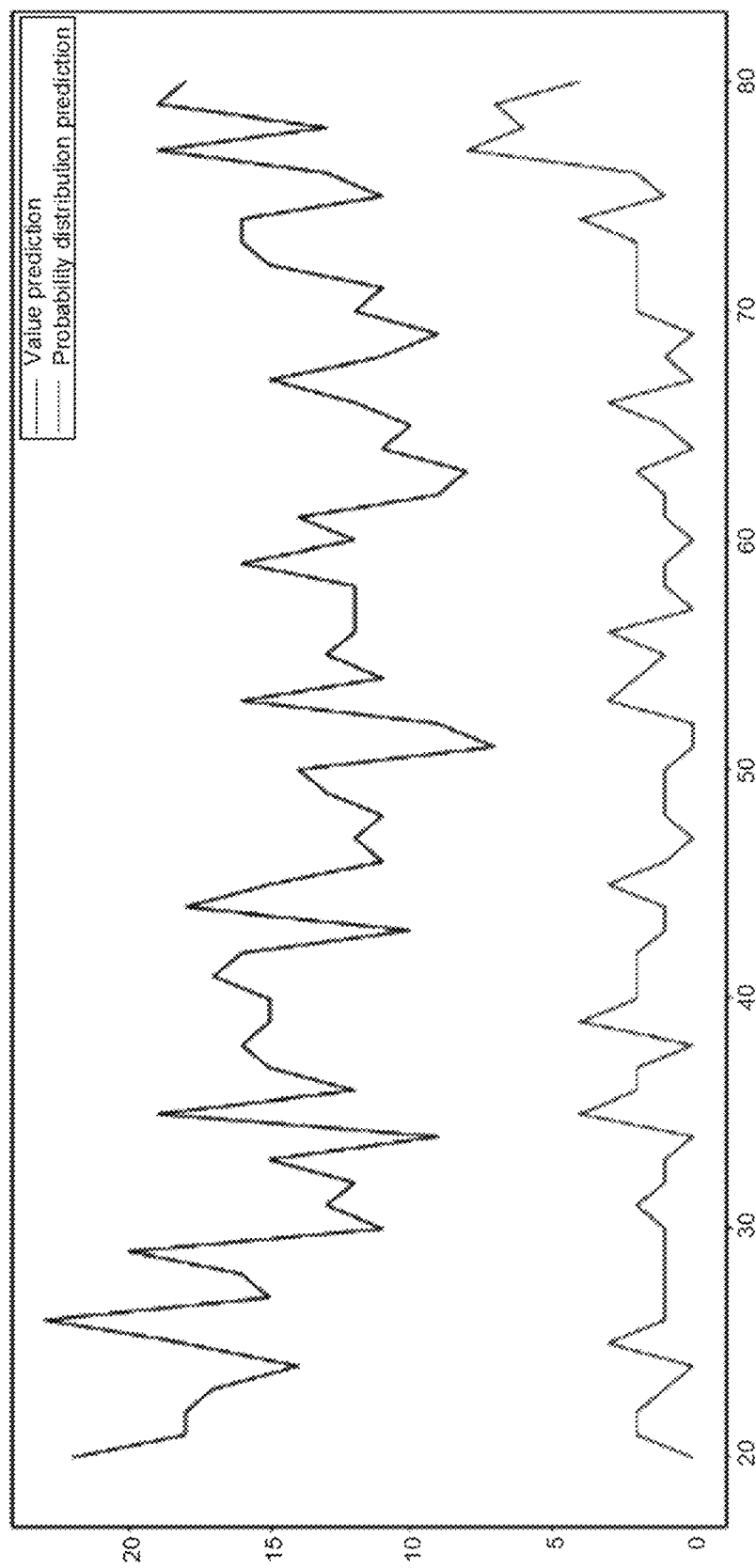
FIGS. 4A-4C illustrate example performance data obtained for allocating resources based on predictions of workload probability parameters, according to some embodiments.
Figure 4B:
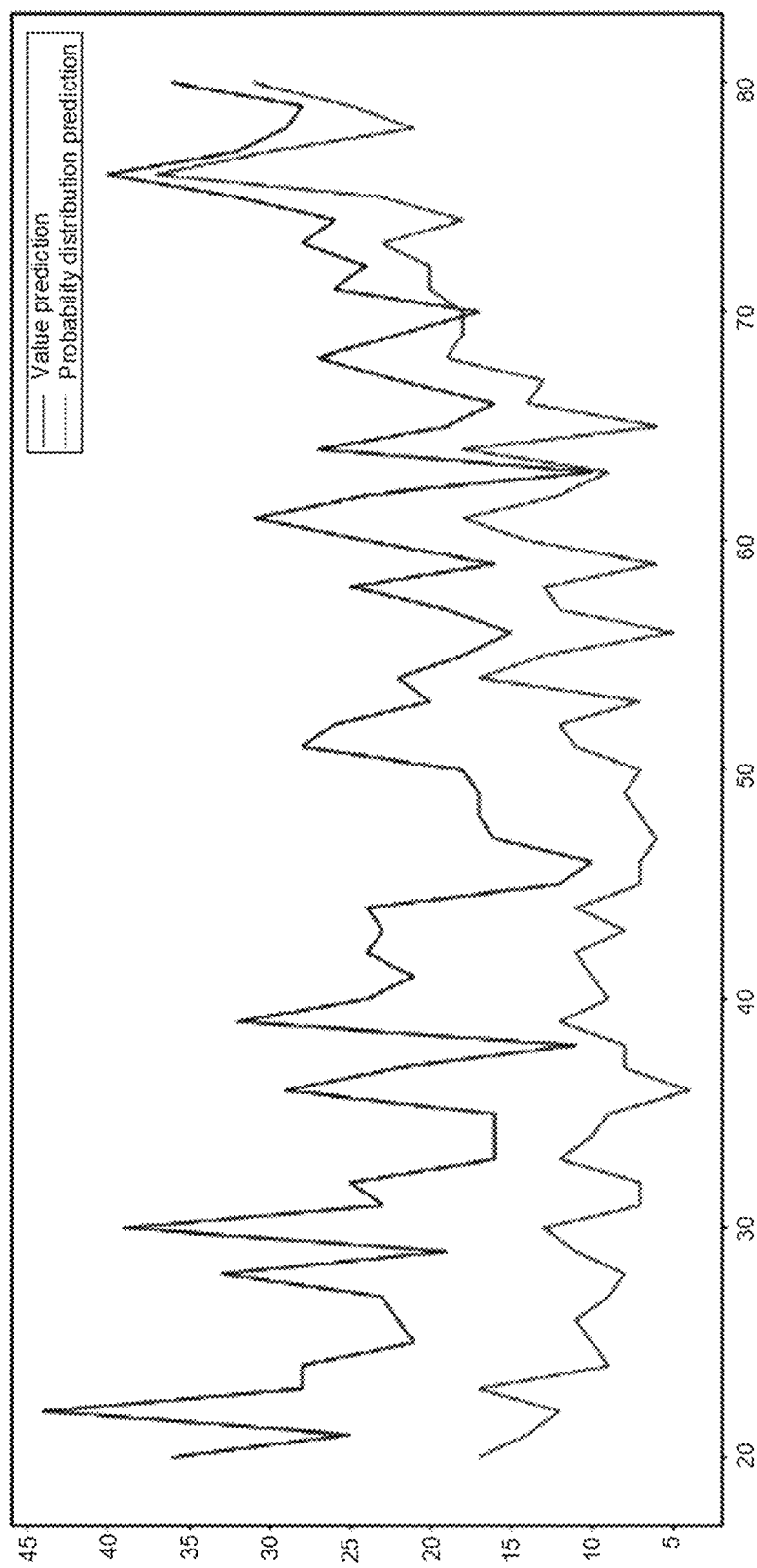
Figure 4C:
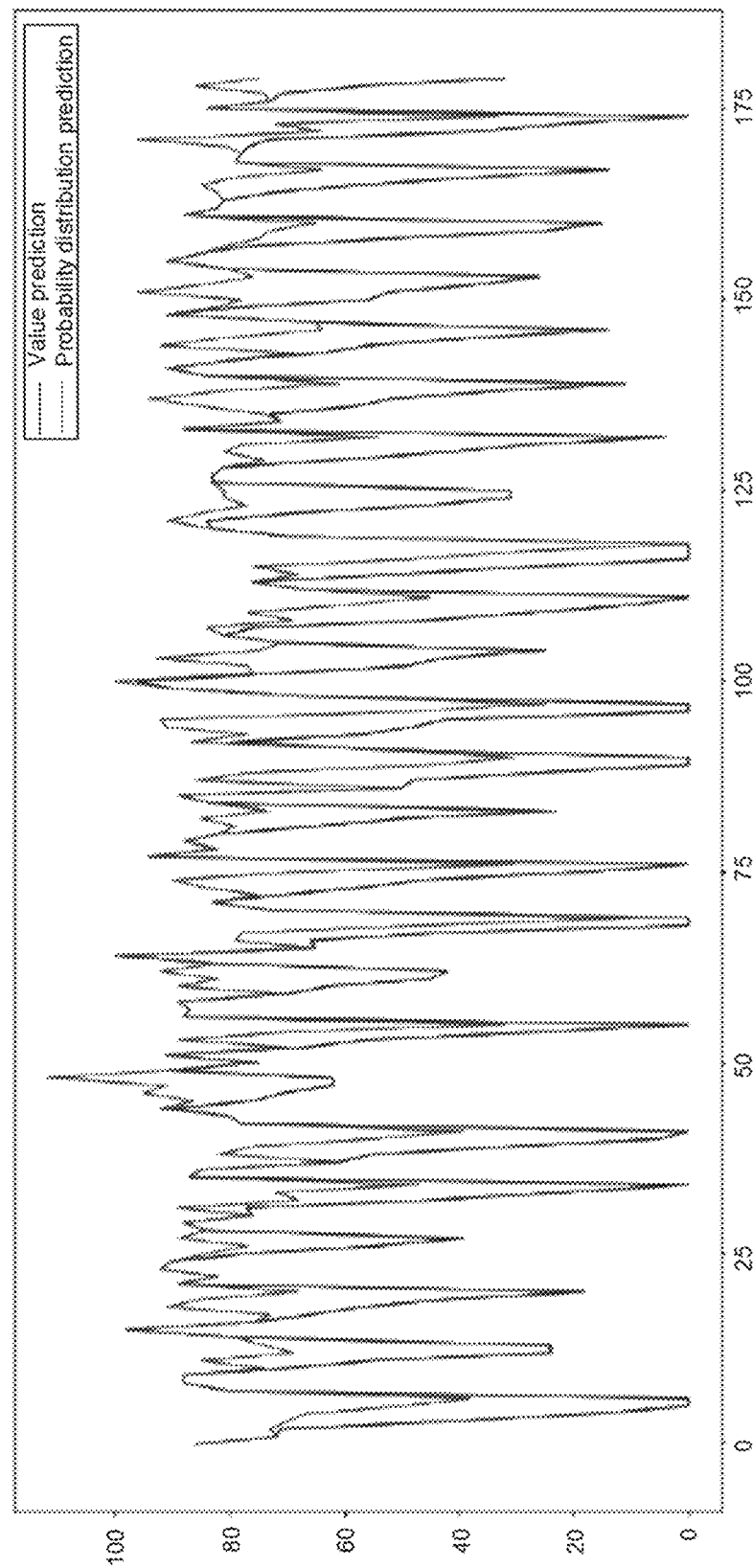

FIGS. 4A-4C illustrate example performance data obtained for allocating resources based on predictions of workload probability parameters, according to some embodiments, The performance data are in comparison with other predictions.

As described above, an open source multi-tier application was used in the experimental example. The performance is compared in two measurements: the total days of wastes and incidents, and the fluctuation of workload prediction. Raw dataset for model training are collected based on the following conditions: a period of T=7-time steps, a sample time window of 180-time steps, Q=2f(u), W=1/2f(u) and a workload quantified from 0 to 100, the average workload in a period: $u \in \{20, 21 \ldots 80\}$, and the workload following a Gaussian distribution: $N(\mu, \sigma^2)$.

FIGS. 4A-4B show the total days of wastes and incidents for a fixed $\sigma$, which is variance representing randomness. The total days of wastes and incidents are caused by the prediction based on value prediction for the resource and workload probability parameters prediction.

FIG. 4A shows the experimental result when $\sigma=10$, where $\mu$ is along the horizontal axis, and ordinate axis represents the total days of wastes and incident. FIG. 4B shows the experimental result when $\sigma=20$. FIG. 4C shows the fluctuation of workload prediction with $\sigma=10$, $\mu=20$. The workload probability distribution prediction can have better performance, as summarized in Table 1.

TABLE 1

| Prediction Model Type Used in Auto Scaling | Average Workload Prediction | Standard Deviation of Workload Prediction | Number of Incidents | Number of Waste | The total days of wastes and incidents | Wastes and incidents days/total days |
|---|---|---|---|---|---|---|
| Probability distribution prediction | 76 | 17 | 0 | 1 | 1 | 0.56% |
| Value prediction | 57 | 28 | 12 | 0 | 12 | 6.67% |

In some examples, the risk of the incident for resource allocation based on workload probability parameters prediction is much lower than the value prediction based resource allocation. In addition, workload fluctuation is more stable for resource allocation based on workload probability parameters prediction compared to resource allocation based on prediction of value of the needed resources.

Figure 5:
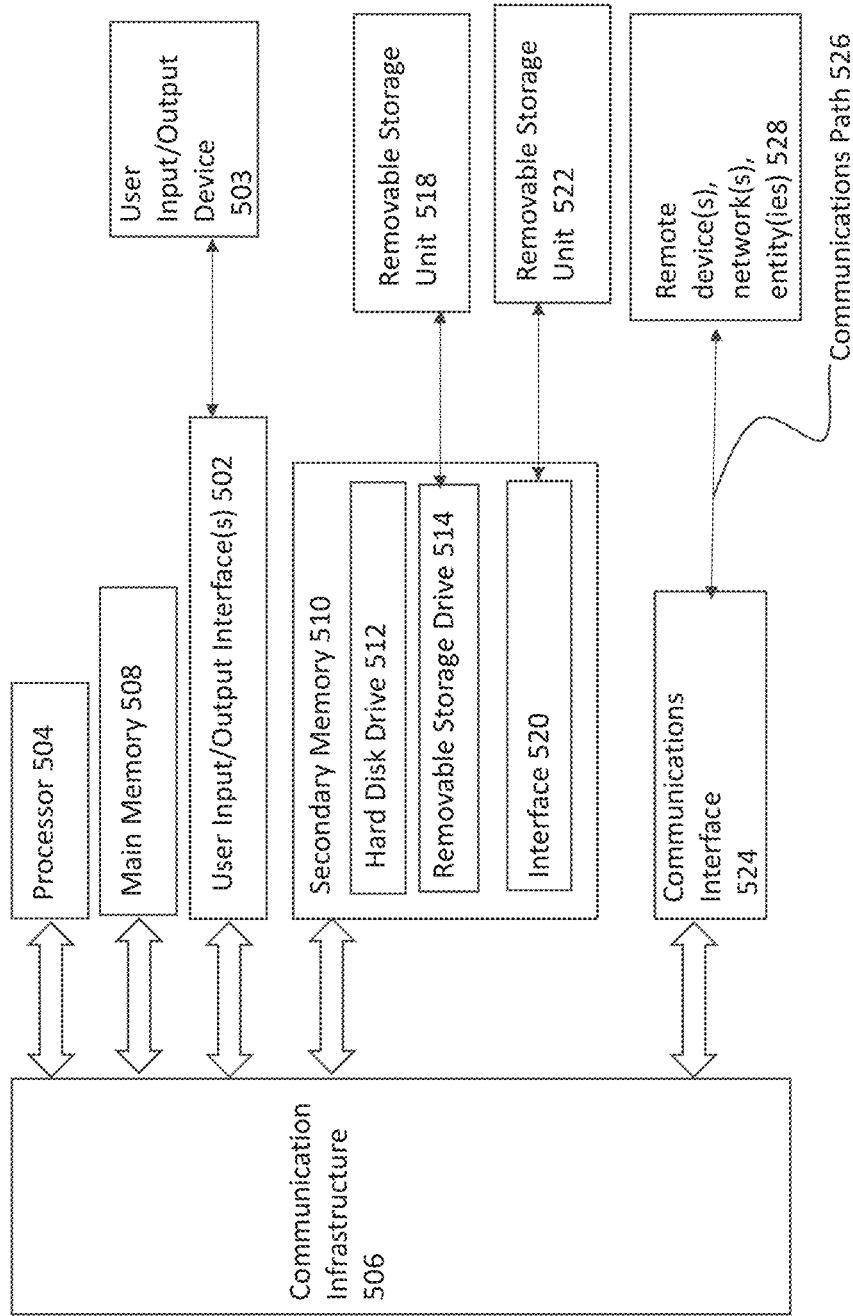
FIG. 5 is an example computer system useful for implementing various embodiments.

Various embodiments can be implemented, for example, using one or more computer systems, such as computer system 500 shown in FIG. 5. Computer system 500 can be used, for example, to implement processes 300 of FIG. 4. For example, computer system 500 can implement and execute a set of instructions comprising operations for allocating resources based on predictions of workload probability parameters, as shown in FIGS. 1, 2A-3C, and 3, such as one or more node 222, the cluster of nodes 224, GUI 217, workload manager 231, workload forecasting operator 232, resource allocation scaler 233, processing operator 234, monitor operator 235, infrastructure operator 241, DHaaS operator 243, node 122, workload manager 131, workload forecasting operator 132, resource allocation scaler 133, processing operator 134, monitor operator 135, resource allocation unit 141, and scheduler 143. Computer system 500 can be any computer capable of performing the functions described herein.

Computer system 500 can be any well-known computer capable of performing the functions described herein.

Computer system 500 includes one or more processors (also called central processing units, or CPUs), such as a processor 504. Processor 504 is connected to communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein "to one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for operating applications on a computing system, comprising:

collecting, by a monitoring operator of a workload manager operated by the computing system, a first set of historical workload data generated by operating a first set of one or more applications at a first number of past time instances, wherein the first set of historical workload data are collected for a set of computing nodes within the computing system, and wherein the monitoring operator monitors historical resources used by the set of computing nodes to operate the first set of one or more applications at the first number of past time instances;

predicting, by the workload manager, probability parameters including a probability density function of a second set of future workload data for operating a second set of one or more applications at a second number of future time instances by the set of computing nodes; and determining, by the workload manager, future resources allocated to operating the second set of one or more applications for the second number of future time instances, based on allocated current resources, a lower bound number of computing nodes to satisfy a quality of service (QOS) for operating the second set of one or more applications, an upper bound number of computing nodes to satisfy the QoS, and the predicted probability parameters, wherein the future resources are determined as a solution for reducing a first probability for allocating a third number of computing nodes over the upper bound number of computing nodes and reducing a second probability for allocating a fourth number of computing nodes below the lower bound number of computing nodes based on an equation related to the first probability and the second probability;

scheduling the determined future resources of the computing system for the second number of future time instances; and operating the second set of one or more applications on the scheduled future resources to generate workload data.

2. The method of claim 1, wherein the first set of one or more applications include same applications as the second set of one or more applications.

3. The method of claim 1, wherein the second set of one or more applications is different from the first set of one or more applications, and a first application of the first set of one or more applications is an old version of a second application of the second set of one or more applications.

4. The method of claim 1, wherein the predicting the probability parameters includes predicting the probability parameters of the second set of future workload data based on recurrent neural networks (RNN).

5. The method of claim 1, wherein the probability parameters include an average of the second set of future workload data, or a standard deviation of the second set of future workload data.

6. The method of claim 1, wherein the first set of historical workload data and the second set of future workload data include a CPU usage, a memory utilization, a network bandwidth, a latency, a delay, or a throughput.

7. The method of claim 1, wherein the first number of past time instances includes 5 past time instances, and the second number of future time instances includes 5 future time instances.

8. The method of claim 1, wherein the first number of past time instances or the second number of future time instances includes a first time instance and a second time instance separated from the first time instance by 1 hour.

9. The method of claim 1, wherein the first set of historical workload data and the second set of future workload data follow a Gaussian distribution or a Poisson distribution.

10. The method of claim 1, wherein the future resources and the current resources include a number of computing nodes of the computing system, a number of storage units of the computing system, or an allocation of network bandwidth.

11. The method of claim 1, wherein the determining future resources includes determining an offset resource to increase or decrease the current resources.

12. A computing system, comprising:
a storage device configured to store a first set of historical workload data generated by operating one or more applications at a first number of past time instances, wherein the first set of historical workload data are collected by a monitoring operator for a set of computing nodes within the computing system, and wherein the monitoring operator monitors historical resources used by the set of computing nodes to operate the one or more applications at the first number of past time instances;
at least one processor coupled to the storage device;
a workload forecasting operator operated by the at least one processor, configured to predict probability parameters including a probability density function of a second set of future workload data for operating the one or more applications at a second number of future time instances by the set of computing nodes; and
a resource allocation scaler operated by the at least one processor, configured to determine future resources allocated to operating the one or more applications for the second number of future time instances, based on allocated current resources, a lower bound number of computing nodes to satisfy a quality of service (QOS) for operating the one or more applications, an upper bound number of computing nodes to satisfy the QoS, and the predicted probability parameters, wherein the future resources are determined as a solution for reducing a first probability for allocating a third number of computing nodes over the upper bound number of computing nodes and reducing a second probability for allocating a fourth number of computing nodes below the lower bound number of computing nodes based on an equation related to the first probability and the second probability; and
a scheduler operated by the at least one processor, configured to schedule the determined future resources of the computing system for the second number of future time instances; and
a processing operator operated by the at least one processor, configured to operate the second set of one or more applications on the scheduled future resources to generate workload data.

13. The system of claim 12, wherein the workload forecasting operator is configured to predict the probability parameters of the second set of future workload data based on recurrent neural networks (RNN).

14. The system of claim 12, wherein the probability parameters include an average of the second set of future workload data, or a standard deviation of the second set of future workload data.

15. The system of claim 12, wherein the first set of historical workload data and the second set of future workload data include a CPU usage, a memory utilization, a network bandwidth, a latency, a delay, or a throughput.

16. The system of claim 12 wherein the first set of historical workload data and the second set of future workload data follow a Gaussian distribution or a Poisson distribution.

17. A non-transitory computer-readable medium having instructions stored thereon that, when executed by at least one computing device, cause the at least one computing device to perform operations comprising:
collecting a first set of historical workload data generated by operating one or more applications at a first number of past time instances, wherein the first set of historical workload data are collected by a monitoring operator for a set of computing nodes within a computing system, and wherein the monitoring operator monitors historical resources used by the set of computing nodes to operate the one or more applications at the first number of past time instances;
predicting probability parameters including a probability density function of a second set of future workload data for operating the one or more applications at a second number of future time instances by the set of computing nodes; and
determining future resources of the computing system allocated to operating the one or more applications for the second number of future time instances, based on allocated current resources, a lower bound number of computing nodes to satisfy a quality of service (QOS) for operating the one or more applications, an upper bound number of computing nodes to satisfy the QoS, and the predicted probability parameters, wherein the future resources are determined as a solution for reducing a first probability for allocating a third number of computing nodes over the upper bound number of computing nodes and reducing a second probability of accident for allocating a fourth number of computing nodes below the lower bound number of computing nodes based on an equation related to the first probability and the second probability;
scheduling the determined future resources of the computing system for the second number of future time instances; and
operating the second set of one or more applications on the scheduled future resources to generate workload data.

18. The non-transitory computer-readable medium of claim 17, wherein the probability parameters include an average of the second set of future workload data, or a standard deviation of the second set of future workload data; and
wherein the first set of historical workload data and the second set of future workload data include a CPU usage, a memory utilization, a network bandwidth, a latency, a delay, or a throughput.

* * * * *